United States Patent
Manabe

(10) Patent No.: US 7,986,361 B2
(45) Date of Patent: Jul. 26, 2011

(54) COLOR PROCESSING APPARATUS AND METHOD THEREOF FOR GENERATING AN INTERPOLATED IMAGE

(75) Inventor: Yoshihiro Manabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 12/243,577

(22) Filed: Oct. 1, 2008

(65) Prior Publication Data

US 2009/0091646 A1    Apr. 9, 2009

(30) Foreign Application Priority Data

Oct. 3, 2007    (JP) ................. 2007-260353

(51) Int. Cl.
*H04N 5/335* (2006.01)
*H04N 5/235* (2006.01)

(52) U.S. Cl. ..................... 348/273; 348/222.1

(58) Field of Classification Search .......... 348/266, 348/272, 273, 279, 280, 222.1, 223.1
See application file for complete search history.

(56) References Cited

U.S. PATENT DOCUMENTS

| | | | |
|---|---|---|---|
| 4,716,455 A * | 12/1987 | Ozawa et al. | 348/277 |
| 5,552,825 A * | 9/1996 | Talluri et al. | 348/222.1 |
| 5,629,734 A | 5/1997 | Hamilton | |
| 7,710,476 B2 * | 5/2010 | Nomura et al. | 348/273 |
| 2006/0176375 A1 * | 8/2006 | Hwang et al. | 348/222.1 |
| 2007/0216785 A1 * | 9/2007 | Nomura et al. | 348/242 |
| 2008/0123943 A1 * | 5/2008 | Sato et al. | 382/162 |
| 2010/0091147 A1 * | 4/2010 | Nomura et al. | 348/279 |

FOREIGN PATENT DOCUMENTS

JP    08-298669 A    11/1996

* cited by examiner

*Primary Examiner* — Nicholas G Giles
(74) *Attorney, Agent, or Firm* — Canon U.S.A. Inc., I.P. Division

(57) ABSTRACT

Interpolated image data is generated from image-sensing data according to the color characteristic of an object. A color filter that has a strong correlation with the color characteristic of an object in image-sensing data captured by an image sensing device having a color filter array in which filters of a plurality of colors are arranged is determined. Interpolated image data of a color component corresponding to the determined color filter is generated by using the pixel values of the image-sensing data corresponding to the color filter. Interpolated image data of the color component corresponding to each of color filters different from the determined color filter is generated by using the generated interpolated image data and the pixel values of the image-sensing data corresponding to each of the color filters different from the determined color filter.

8 Claims, 5 Drawing Sheets

FIG. 1
(PRIOR ART)

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

FIG. 2
(PRIOR ART)

| R11 | G12 | R13 | G14 | R15 |
|-----|-----|-----|-----|-----|
| G21 | B22 | G23 | B24 | G25 |
| R31 | G32 | R33 | G34 | R35 |
| G41 | B42 | G43 | B44 | G45 |
| R51 | G52 | R53 | G54 | R55 |

FIG. 6

| G | R | G | R | G | R | G | R |
|---|---|---|---|---|---|---|---|
| B | X | B | X | B | X | B | X |
| G | R | G | R | G | R | G | R |
| B | X | B | X | B | X | B | X |
| G | R | G | R | G | R | G | R |
| B | X | B | X | B | X | B | X |
| G | R | G | R | G | R | G | R |
| B | X | B | X | B | X | B | X |

FIG. 7

| R11 | G12 | R13 | G14 |
|---|---|---|---|
| X21 | B22 | X23 | B24 |
| R31 | G32 | R33 | G34 |
| X41 | B42 | X43 | B44 |

# COLOR PROCESSING APPARATUS AND METHOD THEREOF FOR GENERATING AN INTERPOLATED IMAGE

BACKGROUND OF THE INVENTION

1. Field of the Invention

The present invention relates to color processing of image-sensing data captured by an image sensing unit that has a color filter array in which filters of a plurality of colors are arranged.

2. Description of the Related Art

Many electronic cameras use a single image sensing device upon generating an image signal for a color image. FIG. 1 is a view showing the arrangement (Bayer arrangement) of a three-color (red R, green G, and blue B) filter array of such an image sensing device. Focusing on G components, the image sensing device can be considered to have a structure in which image sensing elements (G pixels, hereinafter) that output G components and image sensing elements (R pixels and B pixels, hereinafter) that do not output G components are arranged in a checkered pattern.

A technique (demosaicing) of generating a color image by interpolating an image signal generated by a single image sensing device interpolates G components corresponding to the positions of R and B pixels of the image sensing device having a color filter array with a Bayer arrangement by using the average values of the adjacent G pixels. Then, R components corresponding to the positions of G and B pixels, and B components corresponding to the positions of G and R pixels are interpolated using the pixel values obtained by interpolating the G components.

Japanese Patent Laid-Open No. 8-298669 discloses a technique of changing an interpolation method according to the tendency of an object. Particularly, it discloses a technique of calculating an interpolation amount by estimating the tendency of color using a color gradient.

FIG. 2 illustrates interpolation processing disclosed by the above-described document. Respective pixels shown in FIG. 2 are:

R pixel: R11, R13, ..., R55
G pixel: G12, G14, ..., G54
B pixel: B22, B24, ..., B44

When calculating an interpolation amount G33 of the G component of a pixel R33, information HDiff about the color gradient in the horizontal direction and information VDiff about the color gradient in the vertical direction are calculated by:

$$HDiff=|2 \times R33-R31-R35|+|G32-G34|$$

$$VDiff=|2 \times R33-R13-R53|+|G23-G43| \quad (1)$$

According to the magnitudes of HDiff and VDiff, the calculation method of G33 is changed.

if HDiff<VDiff (the correlation in the horizontal direction is strong), $$G33=(G32+G34)/2+(2 \times R33-R31-R35)/4$$

if VDiff<HDiff (the correlation in the vertical direction is strong), $$G33=(G23+G43)/2+(2 \times R33-R13-R53)/4$$

if VDiff=HDiff, $$G33=(G23+G34+G43+G32)/4+(-R13+R31+4 \times R33-R35-R53)/8 \quad (2)$$

That is, upon obtaining the interpolation amount of a G component, the above-described technique estimates information about the color gradient of the G component based on the outputs of R pixels (or B pixels). As a result, the interpolation method can be changed by determining tendency in a spatial direction such as the edge of an object.

However, the above-described technique does not change the interpolation method according to the color characteristic of an object. When uniform interpolation processing is executed irrespective of the color characteristic of an object, the interpolation accuracy may deteriorate depending on the color characteristic of the object.

For example, when the above-described technique is applied to an image signal of a generally red object, which has not undergone interpolation, to interpolate G components and then R and B components are interpolated, since the G components are interpolated first even though the R components possess substantial color information of the object, a sufficient sharpness cannot be obtained.

In addition, in the case of an image signal in which there is no correlation between the gradient of a G component and that of an R component, an image signal which has few R components, or the like, the tendency of a G component cannot be estimated with a high accuracy based on the outputs of R pixels even when the above-described technique is applied, and noise may occur in the image after the interpolation.

SUMMARY OF THE INVENTION

According to an aspect of the present invention, a color processing apparatus includes: a determination unit arranged to determine a color filter having a strong correlation with a color characteristic of an object in image-sensing data captured by an image sensing device having a color filter array in which filters of a plurality of colors are arranged; a first generation unit arranged to generate interpolated image data of a color component corresponding to the color filter determined by the determination unit by using pixel values of the image-sensing data corresponding to the color filter; and a second generation unit arranged to generate interpolated image data of a color component corresponding to each of color filters different from the color filter determined by the determination unit by using the interpolated image data generated by the first generation unit and pixel values of the image-sensing data corresponding to the color filter different from the color filter determined by the determination unit.

According to this aspect, interpolated image data can be generated from image-sensing data according to the color characteristic of an object.

Further features of the present invention will become apparent from the following description of exemplary embodiments with reference to the attached drawings.

BRIEF DESCRIPTION OF THE DRAWINGS

FIG. 1 illustrates the arrangement (Bayer arrangement) of a three-color filter array of an image sensing device;

FIG. 2 illustrates interpolation processing;

FIGS. 6 and 7 illustrate an exemplary filter array having an arrangement in which filters of respective colors are equal in number.

DESCRIPTION OF THE EMBODIMENTS

Color processing of embodiments according to the present invention will now be described in detail with reference to the accompanying drawings. The following description will exemplify a case in which the color processing of the embodiments is implemented in an electronic still camera. However, the present invention is also applicable to a case in which image-sensing data is obtained from an electronic still camera via a storage medium, Universal Serial Bus (USB), or the like and color processing of the obtained image-sensing data is performed.

[Arrangement of Apparatus]

Figure 3:
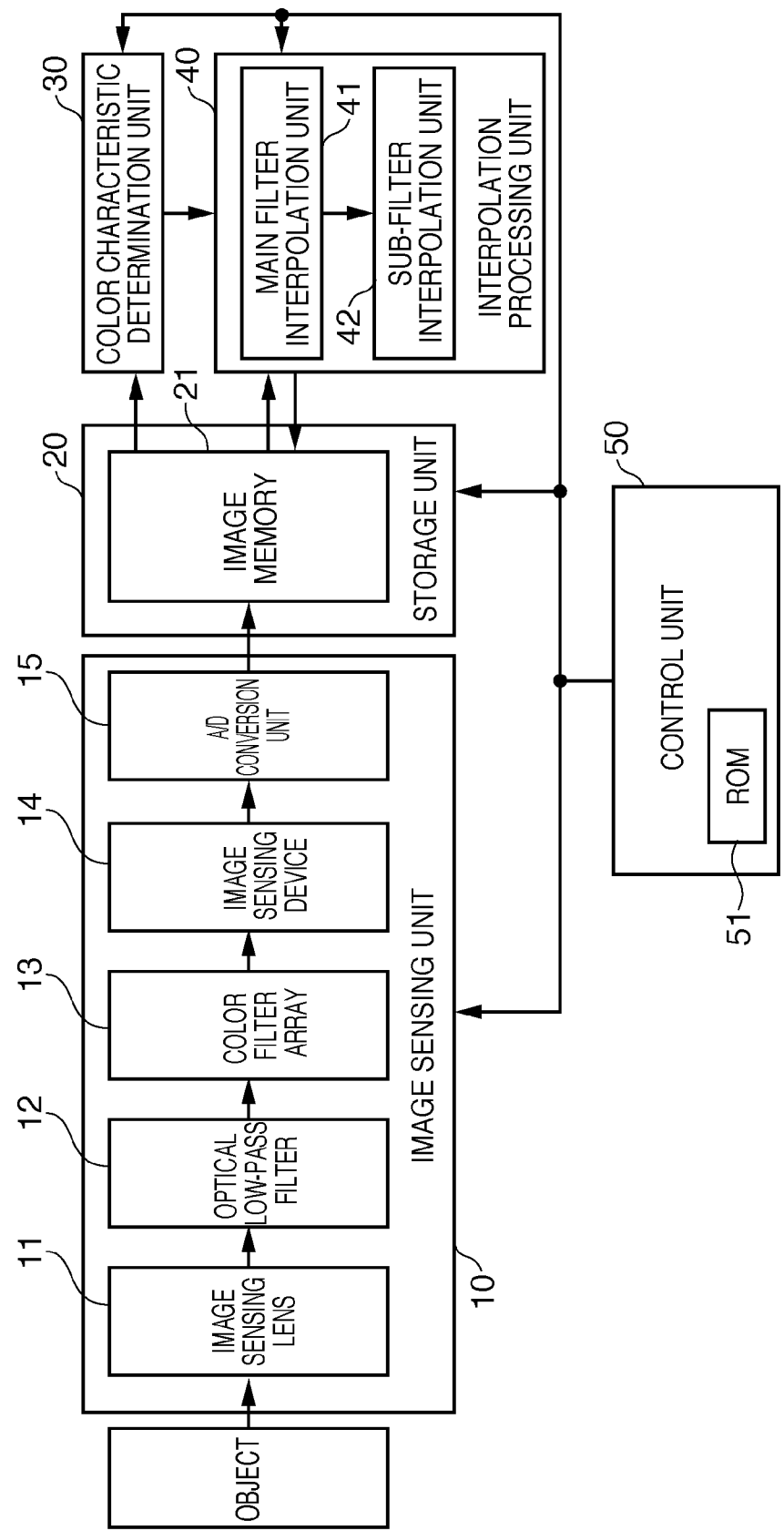
FIG. 3 is a block diagram showing the arrangement of a color processing apparatus of the embodiments.

FIG. 3 is a block diagram showing the arrangement of a color processing apparatus of the embodiments.

Referring to FIG. 3, a control unit 50 of, for example, a one-chip microprocessor controls an image sensing unit 10, a storage unit 20, a color characteristic determination unit 30, and an interpolation processing unit 40 based on a program stored in a read-only memory (ROM) 51.

The image sensing unit 10 has an image sensing lens 11 which forms an object image on an image sensing device 14 and an optical low-pass filter 12 which limits the light passed through the image sensing lens 11 to a low frequency range. Furthermore, the image sensing unit 10 has a color filter array 13 placed on the image sensing device 14, the image sensing device 14, and an analog-to-digital (A/D) conversion unit 15 which converts an analog image signal output by the image sensing device 14 to a digital image signal. Note that the color filter array 13 includes filters of n colors (n is a natural number greater than or equal to 3) and has, for example, a Bayer arrangement or an arrangement (see FIG. 6) in which filters of the respective colors are equal in number.

The storage unit 20 stores a digital image signal (image-sensing data, also referred to as RAW image data, hereinafter) output by the A/D conversion unit 15 in a predetermined area of an image memory 21 while associating it with the colors of the color filter array 13. The storage unit 20 stores interpolated image data obtained by interpolation processing (to be described later) by the color characteristic determination unit 30 and interpolation processing unit 40 in an area different from the storage area of RAW image data. Note that RAW image data and interpolated image data are stored in correspondence with the position (the pixel position, hereinafter) of the individual image sensing element.

[Interpolation Processing]

Figure 4:
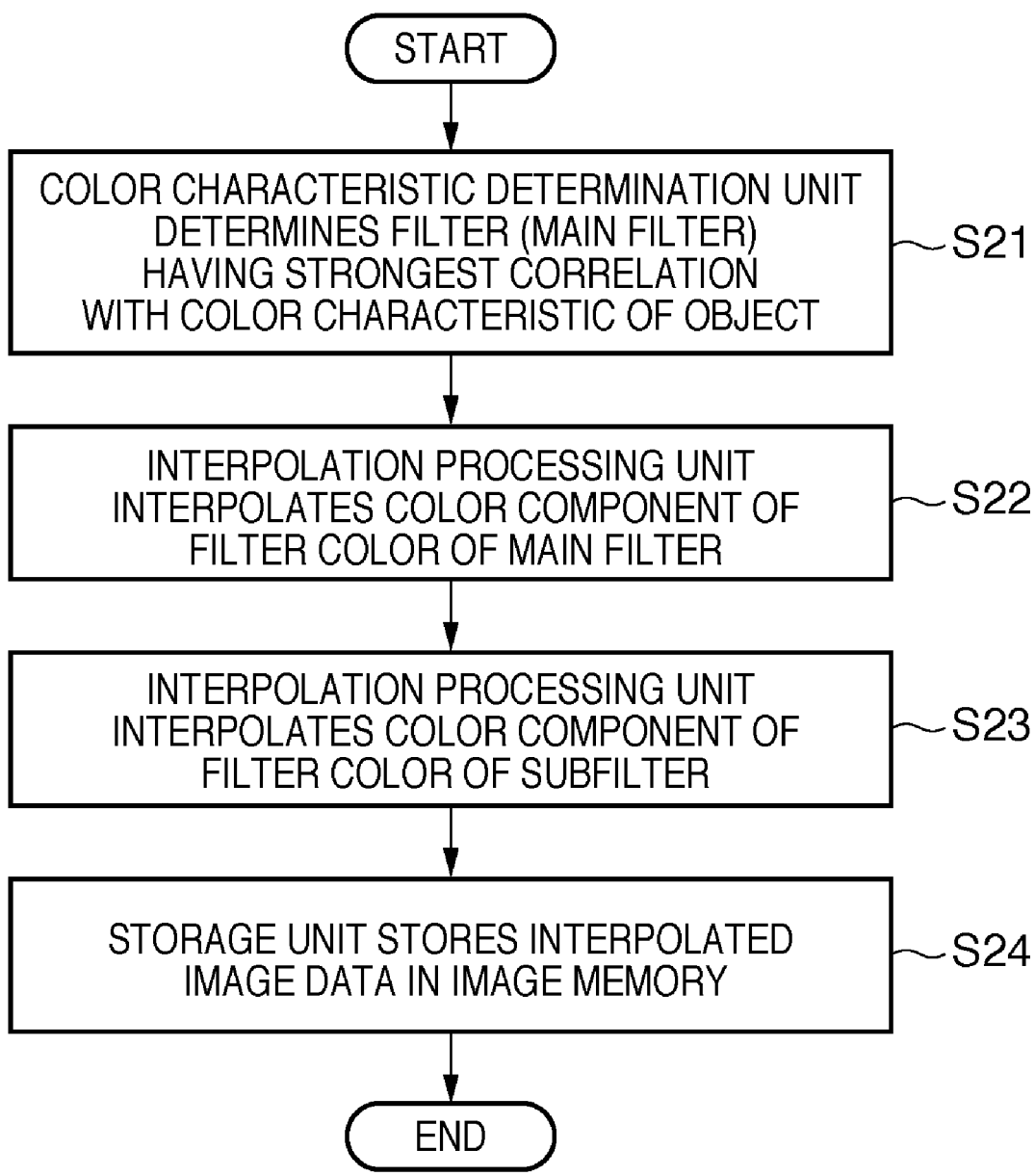
FIGS. 4 and 5 are flowcharts illustrating interpolation processing by a color characteristic determination unit and an interpolation processing unit.

FIG. 4 is a flowchart illustrating the interpolation processing by the color characteristic determination unit 30 and interpolation processing unit 40. This processing is performed under the control of the control unit 50 after RAW image data is stored in the image memory 21.

The color characteristic determination unit 30 checks the correlations between the color characteristic of the object and the colors of the filters (the filter colors, hereinafter) from a plurality of pixel values of the RAW image data, and determines the filter (the main filter, hereinafter) which has a strongest correlation with the color characteristic of the object (S21). The interpolation processing unit 40 interpolates color components of the filter color of the main filter (S22), and then interpolates color components of the filter colors of the filters (the sub filters, hereinafter) other than the main filter (S23). When the interpolation processing of the interpolation processing unit 40 is complete, the control unit 50 controls the storage unit 20 to store the interpolated image data in the image memory 21 (S24).

Figure 5:
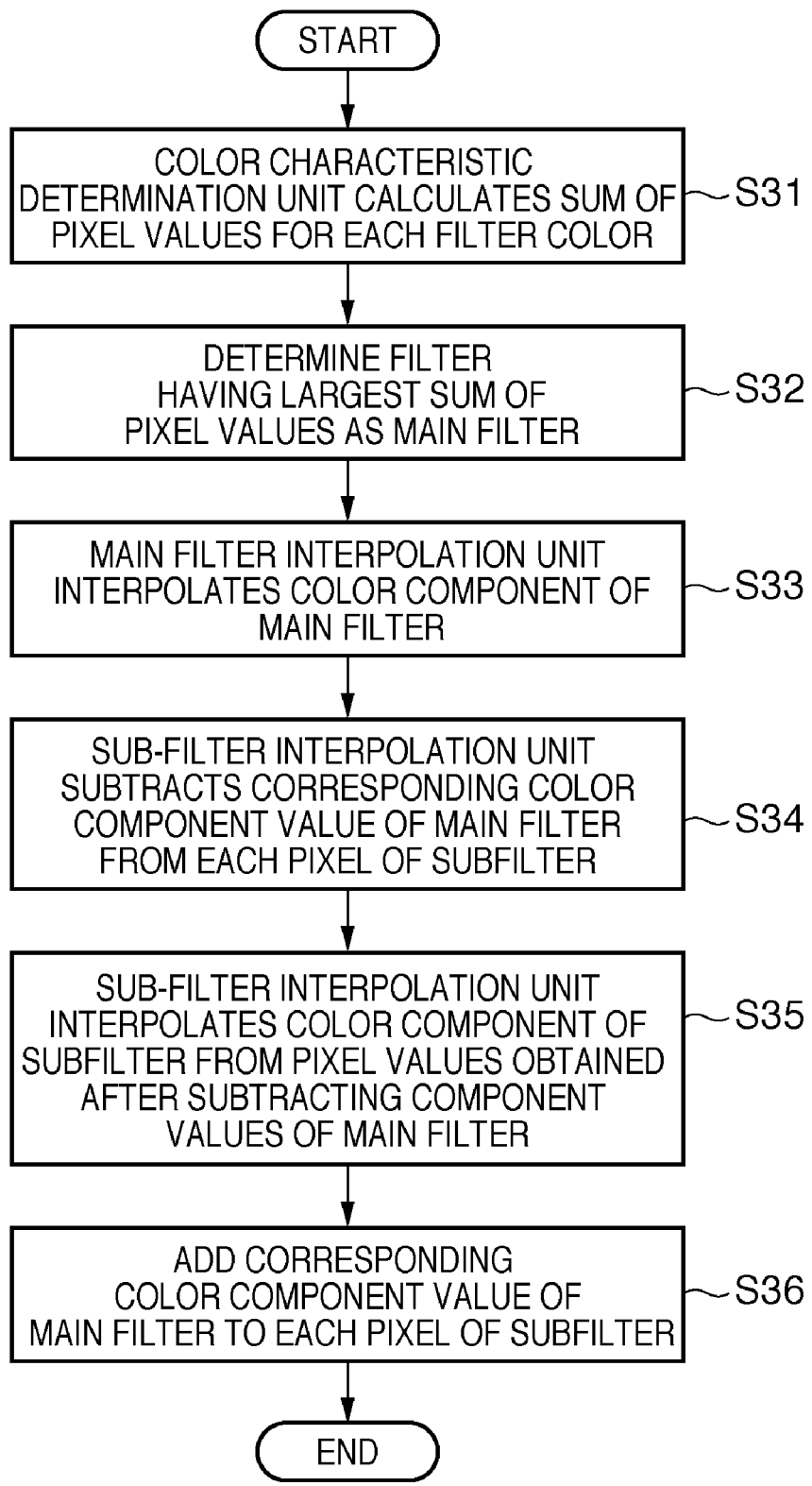

FIG. 5 is a flowchart illustrating details of the interpolation processing (S21 to S23) by the color characteristic determination unit 30 and interpolation processing unit 40.

The color characteristic determination unit 30 calculates statistics of the image data of the respective filter colors of the RAW image data stored in the image memory 21 (S31). For example, when the color filter array 13 is a four-color filter array of R, G, B, and X (arbitrary color) shown in FIG. 6, the color characteristic determination unit 30 calculates the sum of the pixel values for each filter color. The color characteristic determination unit 30 then compares the sums of the pixel values of the respective filter colors and determines the filter having a largest sum of the pixel values as the main filter (S32). The main filter determination method is not limited to that based on the sums of pixel values, but any statistic, for example, the average values or medians of the pixel values of the respective filter colors that can determine the main filter can be used. Note that when the filters of the respective colors are different in number, such as in a Bayer arrangement, determination using the average values of the pixel values of the respective filter colors is desirable. When a user wants to determine the main color of an object, determination using the medians of the pixel values is more preferable than that using the sums or average values of the pixel values.

For example, when the R filter is determined as the main filter, a main filter interpolation unit 41 as a first generation unit of interpolated image data interpolates R component corresponding to the R filter (S33). For example, assuming the pixel arrangement as shown in FIG. 7, interpolation of R components in a 3×3 block from R11 to R33 is executed by:

$$R12=(R11+R13)/2$$

$$R21=(R11+R31)/2$$

$$R23=(R13+R33)/2$$

$$R32=(R31+R33)/2$$

$$R22=(R21+R12+R23+R32)/4 \quad (3)$$

A sub-filter interpolation unit 42 as a second generation unit of interpolated image data subtracts the corresponding R component values from the respective pixels of the G, B, and X filters as the sub filters (S34), and interpolates G, B, and X components using the respective pixel values obtained after subtracting the R component values (S35). The sub-filter interpolation unit 42 then adds the corresponding R component values to the respective pixels (S36). For example, focusing on the interpolation processing of X22, the above-described processing is expressed by:

$$X22=\{(X21-R21)+(X23-R23)\}/2+R22 \quad (4)$$

The processing of the color characteristic determination unit 30 and interpolation processing unit 40 can be applied to a whole image or may be applied to a partial region of an image. For example, in case of an image captured under a red illumination, the color characteristic determination unit 30 determines the color characteristic of the whole image and the main filter interpolation unit 41 starts from the interpolation processing of R components. Alternatively, the color characteristic determination unit 30 may recognize an object, segment an image into partial regions, and determine the color characteristic for each partial region. In this case, interpolation processing may be executed using the R filter as the main filter for the red partial region and using the G filter as the main filter for the green partial region.

In this manner, according to the color characteristic of an object, interpolation processing of a color component closest to the color characteristic of the object is executed, and then interpolation processing of the other color components is executed. With this arrangement, it is possible to execute interpolation processing according to the characteristic of an object so as not to lose any significant color information of the object, thus improving the color accuracy of interpolation processing.

For example, in RAW image data of a crimson sunset, the R component has the most color information of the object. Therefore, interpolation processing is executed using the R filter as the main filter. With this arrangement, it is possible to generate interpolated image data expressing subtle changes in the crimson color of the sunset.

In addition, the processing of the above-described embodiment is applicable to a case in which the spectrum characteristic of an object is estimated from RAW image data captured by a multiband camera having many color filters or the like. A filter close to the spectrum characteristic of the object is selected as the main filter and the other filters are used as the sub filters, or filters close to the spectrum characteristic of the object are selected as a main filter group. With this arrangement, interpolation processing is executed while the information of the spectrum characteristic of the object is held, so that the spectrum characteristic of the object can be calculated with a high accuracy.

When the color filter array 13 has many color filters such as R, G, B, C, M and Y filters, the color characteristic determination unit 30 can determine a plurality of filters, each of which has a correlation with the color characteristic of the object stronger than a predetermined threshold. In other words, the determined filter has the strong correlation with the color characteristic of the object.

The color processing of a second embodiment according to the present invention will now be described. Note that the same components as in the above-described embodiment (first embodiment) are denoted by the same reference numerals in the second embodiment, and a detailed description thereof will not be repeated.

The second embodiment describes the processing of a color characteristic determination unit 30 and an interpolation processing unit 40 when a color filter array 13 has a Bayer arrangement.

The color characteristic determination unit 30 calculates average values Rave, Gave, and Bave of the pixel values of the respective color filters (S31), and determines the color filter having a largest average value as a main filter (S32). For example, when the G filter is determined as the main filter, a main filter interpolation unit 41 interpolates G components (S33).

When an interpolation amount G33 of the G component of a pixel R33 (pixel of interest) shown in FIG. 2 is obtained, the main filter interpolation unit 41 calculates information HDiff about the color gradient in the horizontal direction and information VDiff about the color gradient in the vertical direction by:

$$HDiff = k \times |2 \times R33 - R31 - R35| + |G32 - G34|$$

$$VDiff = k \times |2 \times R33 - R13 - R53| + |G23 - G43| \quad (5)$$

where k is a weighting coefficient (0<k<1) according to the average value (Rave in this example) of the color component of the pixel of interest.

The main filter interpolation unit 41 changes the calculation method of the interpolation amount according to the magnitudes of HDiff and VDiff.

if HDiff<VDiff (the correlation in the horizontal direction is strong), $$G33 = (G32 + G34)/2 + k(2 \times R33 - R31 - R35)/4$$

if VDiff<HDiff (the correlation in the vertical direction is strong), $$G33 = (G23 + G43)/2 + k(2 \times R33 - R13 - R53)/4$$

if VDiff=HDiff, $$G33 = (G23 + G34 + G43 + G32)/4 + k(-R13 + R31 + 4 \times R33 - R35 - R53)/8 \quad (6)$$

The processing of a sub-filter interpolation unit 42 is the same as in the first embodiment.

In this manner, information representing the gradient of a color of interest is multiplied by the weighting coefficient k considering the average value of the color of interest. With this arrangement, for example, when the average value Rave of the R components is considerably small, the pixel values of the R components are considered as noise, and the value of the coefficient k is approximated to 0 so that the average value Rave is not used in the interpolation of G components. When the average values Rave and Gave are almost equal, it is considered that there is a correlation between the gradients of the R and G components, and the value of the coefficient k is approximated to 1. With this arrangement, when changing the equations of interpolation processing according to an object, it is possible to reduce the noise of interpolated image data, thus improving the color accuracy of the interpolated image data.

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, an OS (operating system) or the like working on the computer can perform all or a part of the processes in accordance with designations of the program code and realize functions according to the above embodiments.

Furthermore, after the program code is read from the storage medium it can be written in a function expansion card which is inserted into the computer or in a memory provided in a function expansion unit which is connected to the computer, CPU or the like and the function expansion card or unit can perform a part or all of the process in accordance with designations of the program code and realize functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-260353, filed Oct. 3, 2007, which is hereby incorporated by reference herein in its entirety.

What is claimed is:

1. A color processing apparatus comprising:

a determination unit arranged to determine a color filter having a strong correlation with a color characteristic of an object in image-sensing data captured by an image sensing device having a color filter array in which filters of a plurality of colors are arranged;

a first generation unit arranged to generate interpolated image data of a color component corresponding to the color filter determined by the determination unit by using pixel values of the image-sensing data corresponding to the color filter; and a second generation unit arranged to generate interpolated image data of a color component corresponding to each of color filters different from the color filter determined by the determination unit by using the interpolated image data generated by the first generation unit and pixel values of the image-sensing data corresponding to the color filter different from the color filter determined by the determination unit.

2. The apparatus according to claim 1, wherein the determination unit calculates a statistic of pixel values of the image-sensing data corresponding to each of the filters of the plurality of colors and determines a color filter having a strong correlation with the color characteristic of the object based on the statistic.

3. The apparatus according to claim 2, wherein pixels corresponding to each of the color filters of the plurality of colors of the image sensing device are equal in number and the statistic is a sum of the pixel values of the pixels corresponding to the color filters.

4. The apparatus according to claim 2, wherein at least a number of pixels corresponding to a color filter of one color of the image sensing device is different from a number of pixels corresponding to the different color filter, and the statistic is an average value of the pixel values of the pixels corresponding to the color filters.

5. The apparatus according to claim 2, wherein the first generation unit calculates a gradient of the color component while considering the statistic of pixel values of the image-sensing data corresponding to each of the filters of the plurality of colors, and generates the interpolated image data by a calculation method corresponding to the gradient of the color component.

6. The apparatus according to claim 1, further comprising a segmentation unit arranged to segment the image-sensing data into partial areas based on a recognition result of an object of the image-sensing data, wherein the determination unit, the first generation unit, and the second generation unit execute the determination and the generation for each of the partial areas.

7. A color processing method comprising:

determining a color filter having a strong correlation with a color characteristic of an object in image-sensing data captured by an image sensing device having a color filter array in which filters of a plurality of colors are arranged;

generating interpolated image data of a color component corresponding to the determined color filter by using pixel values of the image-sensing data corresponding to the color filter; and generating interpolated image data of a color component corresponding to each of color filters different from the determined color filter by using the generated interpolated image data and pixel values of the image-sensing data corresponding to the color filter different from the determined color filter.

8. A computer-readable storage medium storing a computer-executable program for causing a computer to perform a color processing method, the method comprising:

determining a color filter having a strong correlation with a color characteristic of an object in image-sensing data captured by an image sensing device having a color filter array in which filters of a plurality of colors are arranged;

generating interpolated image data of a color component corresponding to the determined color filter by using pixel values of the image-sensing data corresponding to the color filter; and generating interpolated image data of a color component corresponding to each of color filters different from the determined color filter by using the generated interpolated image data and pixel values of the image-sensing data corresponding to the color filter different from the determined color filter.

* * * * *